H. K. HITCHCOCK.
MANUFACTURE OF GLASS PLATES OR SHEETS.
APPLICATION FILED AUG. 23, 1905.

1,128,448.

Patented Feb. 16, 1915.
7 SHEETS—SHEET 1.

H. K. HITCHCOCK.
MANUFACTURE OF GLASS PLATES OR SHEETS.
APPLICATION FILED AUG. 23, 1905.

1,128,448.

Patented Feb. 16, 1915.

WITNESSES:
Herbert Bradley.
Dwight Benton.

INVENTOR
Halbert K. Hitchcock
by Christy and Christy
Atty's.

H. K. HITCHCOCK.
MANUFACTURE OF GLASS PLATES OR SHEETS.
APPLICATION FILED AUG. 23, 1905.

1,128,448.

Patented Feb. 16, 1915.
7 SHEETS—SHEET 6.

WITNESSES:
Herbert Bradley.
Dwight Canton.

INVENTOR
Halbert K. Hitchcock
by Christy and Christy
Atty's.

H. K. HITCHCOCK.
MANUFACTURE OF GLASS PLATES OR SHEETS.
APPLICATION FILED AUG. 23, 1905.

1,128,448.

Patented Feb. 16, 1915.
7 SHEETS—SHEET 7.

WITNESSES:
Herbert Bradley
Dwight Benton

INVENTOR
Halbert K. Hitchcock
by Christy and Christy
Atty's

UNITED STATES PATENT OFFICE.

HALBERT K. HITCHCOCK, OF TARENTUM, PENNSYLVANIA.

MANUFACTURE OF GLASS PLATES OR SHEETS.

1,128,448.

Specification of Letters Patent.

Patented Feb. 16, 1915.

Application filed August 23, 1905. Serial No. 275,462. REISSUED

*To all whom it may concern:*

Be it known that I, HALBERT K. HITCHCOCK, residing at Tarentum, in the county of Allegheny and State of Pennsylvania, a citizen of the United States, have invented or discovered certain new and useful Improvements in the Manufacture of Glass Plates or Sheets, of which improvements the following is a specification.

The invention described herein relates to certain improvements in apparatus for the practice of the method described in application Serial Number 108,611, filed by me May 23, 1902, and the invention consists generally stated in providing means whereby glass in a plastic condition is fed to a formative point and whereby a formative tension is applied to the glass when it reaches such point.

The invention also consists in providing suitable means whereby the temperature of the glass can be regulated while flowing to and at the formative point and also while being subjected to the formative tension.

The invention is hereinafter more fully described and claimed.

In the accompanying drawings forming a part of this specification

Figure 11:
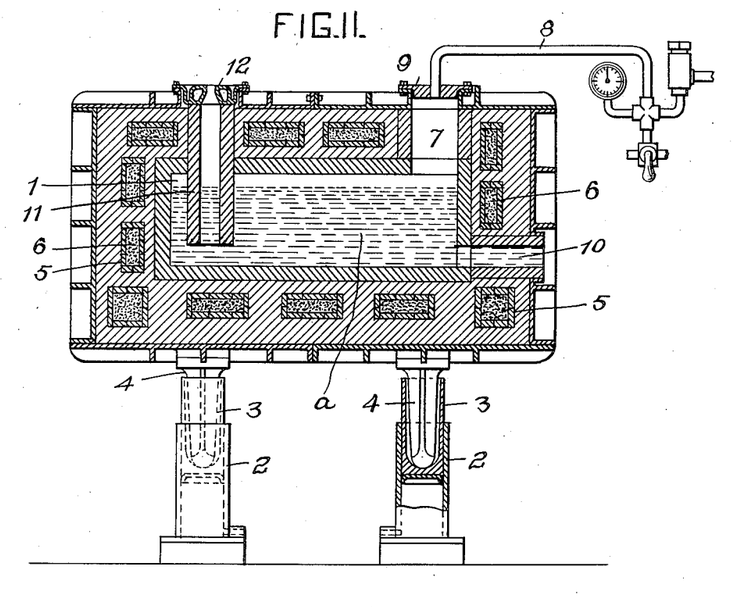
Fig. 11 is a sectional elevation of a glass retaining receptacle from which the glass is fed in the formation of the sheets.

In the practice of my invention it is preferred that the glass from which the sheets are to be formed should be charged into a receptacle provided with suitable means for maintaining the glass at the desired temperature. A desirable construction consists of a chamber or receptacle 1 formed of heat resisting material held in position by a metal shell. For purposes of adjustment hereinafter described it is preferred to provide for a vertical adjustment and leveling of the receptacle. A convenient means for this purpose consists of fluid pressure cylinders 2 provided with rams 3 having sockets in their upper ends for the reception of legs 4 secured at their upper ends to the basin or receptacle. As shown in Fig. 11 the legs are somewhat smaller than the sockets in the pistons and have their lower ends rounded so that the legs may have a slight rocking movement within the sockets. While any suitable means may be employed for heating the receptacle it is preferred to employ electrical means such as shown, as permitting a better control of the temperature. A desirable construction of such heaters consists of a series of shells 5, extending through the masonry forming the receptacle and preferably formed of siloxicon or carborundum. These shells or casings inclose cores 6 formed of pulverized or granulated carbon or other suitable material and connected by suitable electrodes and terminals to an electric generator, the current from which is regulated by suitable means well known in the art. By suitably arranging these electric heaters around and in the walls of the receptacle any desired temperature may be maintained in different parts or entirely throughout the receptacle. While the receptacle may be charged through the opening through which the glass is subsequently to be fed it is preferred to employ an independent inlet 7 for that purpose and when the apparatus is in operation fluid pressure is maintained on the surface of the glass in the chamber 1 preferably by means of a pipe 8 passing through the cap or cover of the inlet 7. For removing glass which cannot be utilized in the forming of the sheets an outlet 10 is provided in line with the bottom of the receptacle and adapted to be temporarily closed by any suitable means known in the art. When the glass is subjected to pressure it is forced up through a feed tube 11 projecting down nearly to the bottom of the receptacle so that all or nearly all the glass can be forced through the tube. The glass is directed by the tube to a "slot" 12 which is formed in a casting secured to the jaw of the receptacle in line with the feed tube.

Figure 12:
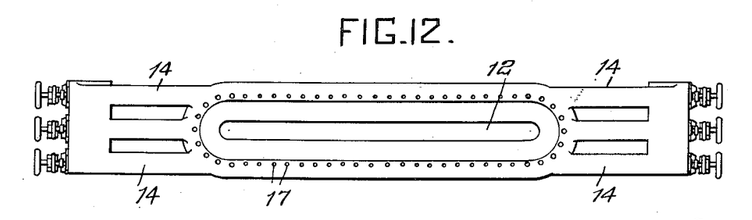
Figs. 12 and 13 are top plan and a sectional elevation, respectively, of a modified form of the slot or opening through which this glass is fed in the formation of the sheets.
Figure 13:
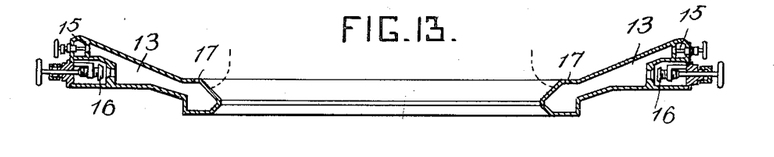

In the construction shown in Fig. 11 the walls of the slot are made hollow so that air may be forced therethrough either cold or heated to regulate the temperature of the walls in contact with the glass as hereinafter described. A second construction of slot is shown in Figs. 12 and 13 and consists of a casting having an oblong opening or passage 12 therethrough, the walls of such casting being made hollow and connected with combustion chambers 13 at the ends of the castings. It is preferred that these combustion chambers should be connected with the chamber immediately around the slot or opening 12 by three or more branches 14, the outside branches being in line with the side chambers in the casting and the intermediate branches in line with the axis of the oblong opening. Gas and air are admitted into the combustion chambers through suitable ports controlled by valves 15 and 16, the ports being preferably arranged in line with the branches 14. In the top walls of the chambers are formed openings 17 for the escape of air or gases or products of combustion. It will be readily understood that by a proper adjustment of the valves 15 and 16 the temperature of the walls of the slot in contact with the glass as hereinafter described may be very accurately regulated.

Figure 1:
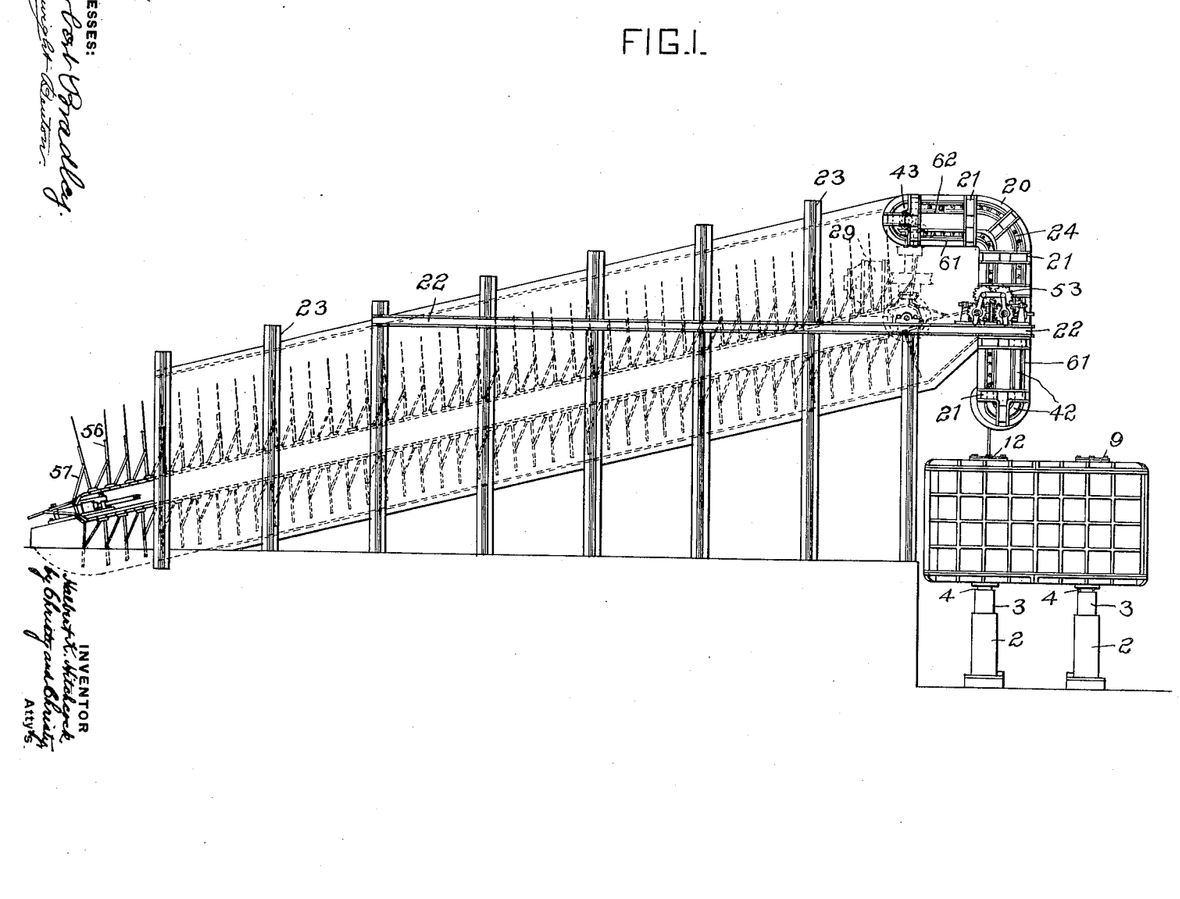
Figure 1 is a side elevation of my improved apparatus for the manufacture of glass sheets.
Figure 2:
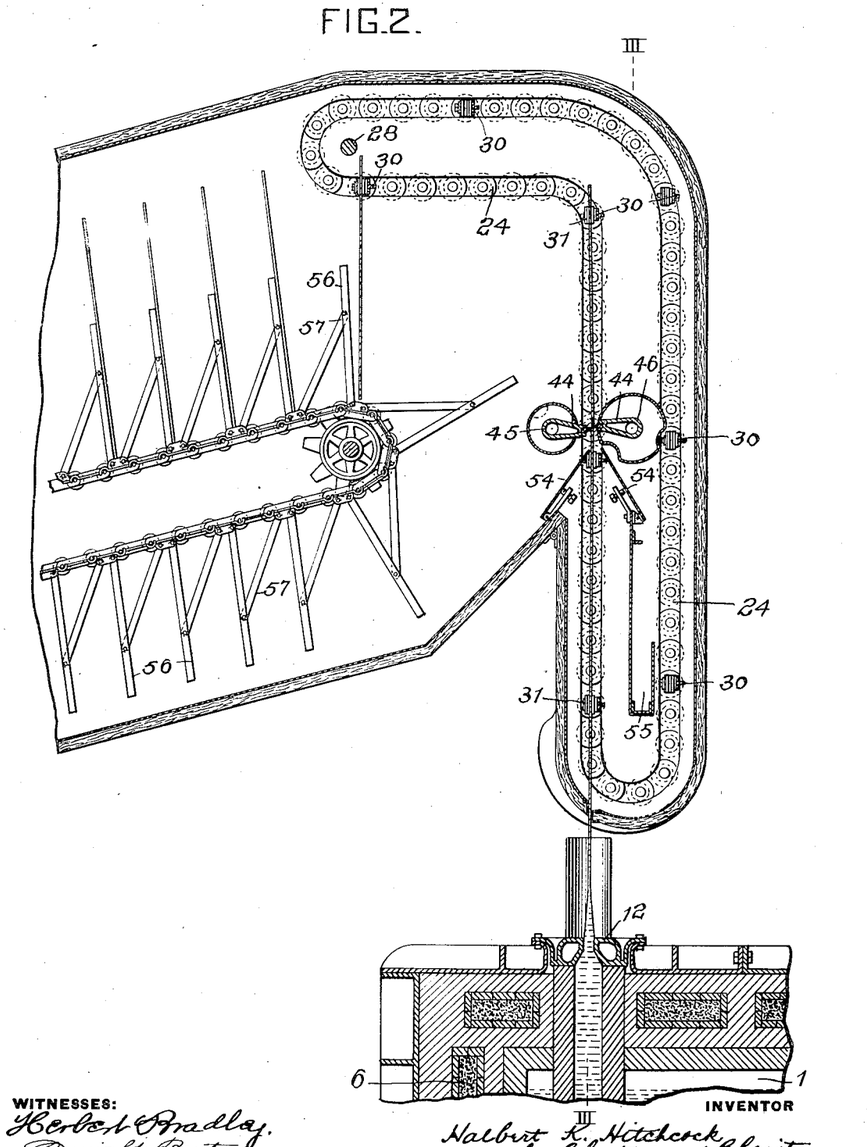
Fig. 2 is a sectional elevation on a large scale of a portion of my apparatus the plane of section being indicated by the line II—II Fig. 3.
Figure 3:
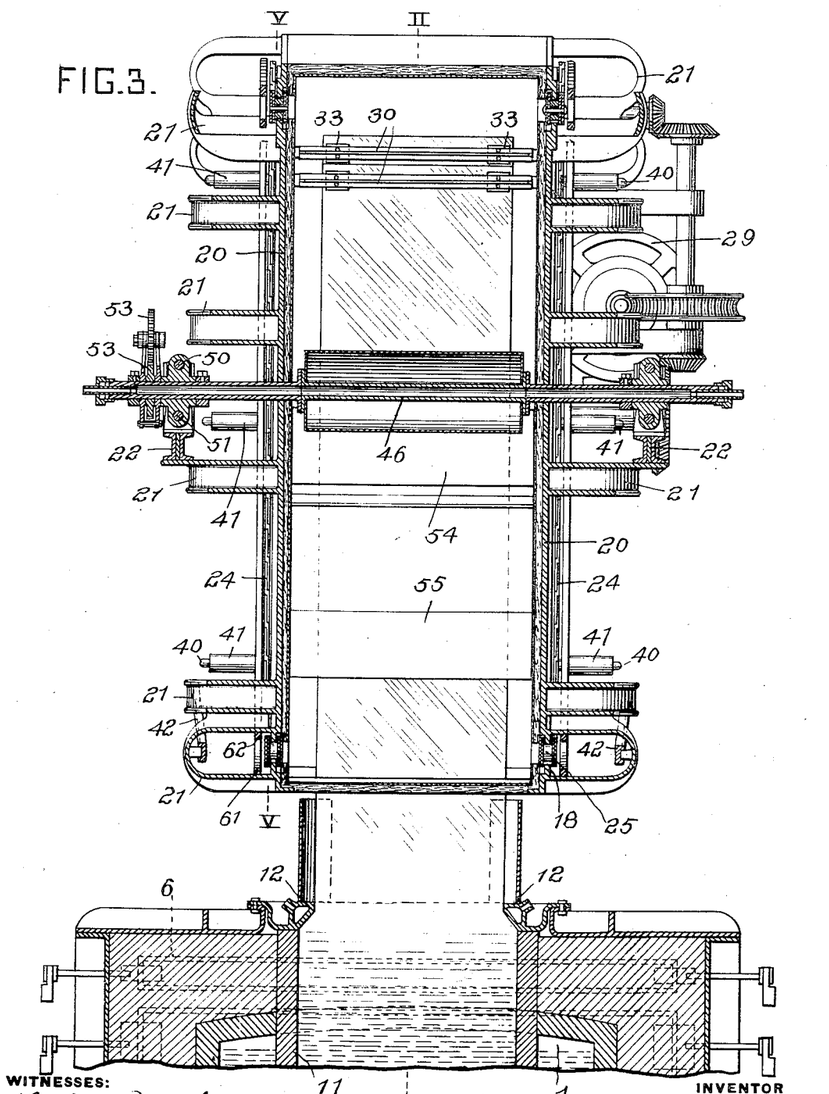
Fig. 3 is a sectional elevation on a plane indicated by the line III—III Fig. 2.
Figure 4:
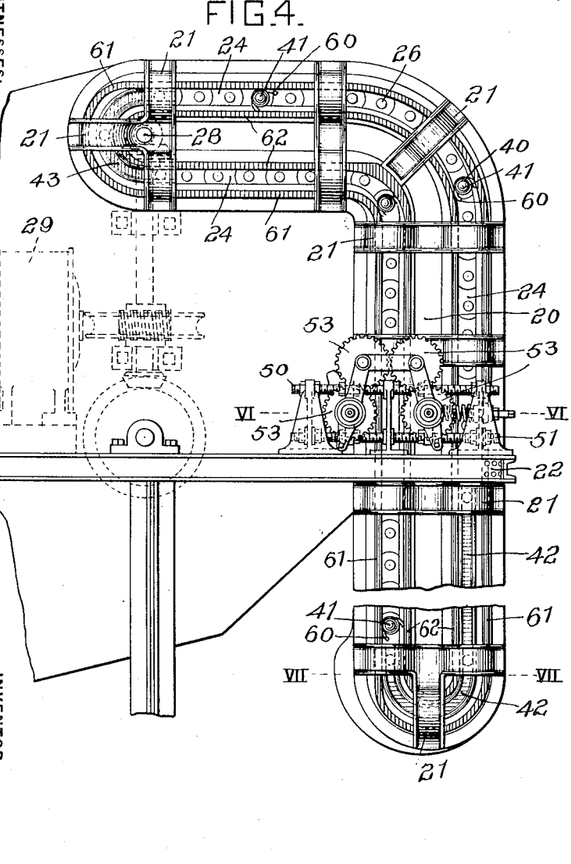
Fig. 4 is a side elevation of a portion of the apparatus into which the sheets are drawn and divided into sections.
Figure 6:
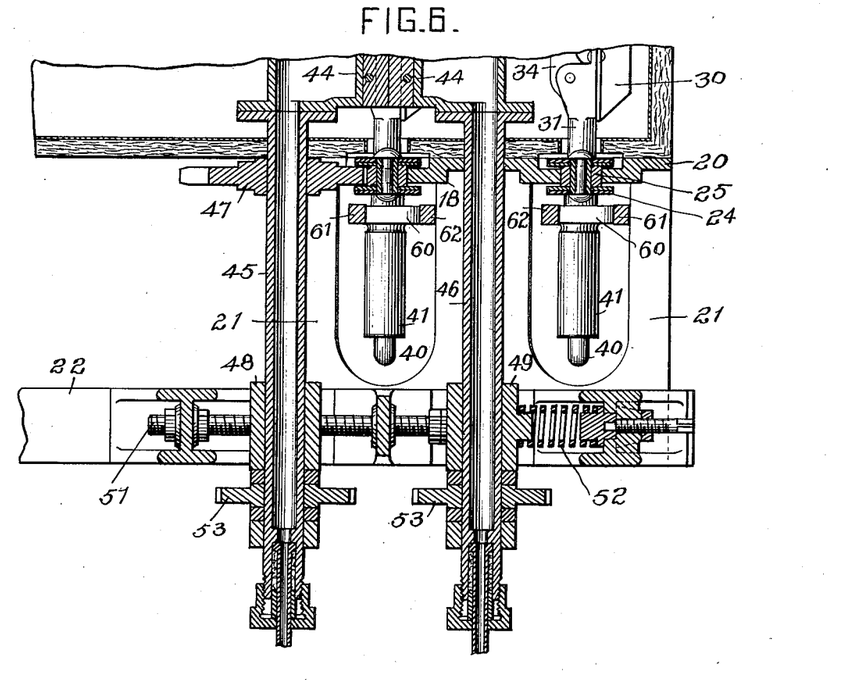
Figs. 6 and 7 are sectional detail views on planes indicated by the lines VI—VI and VII—VII Fig. 4.
Figure 7:
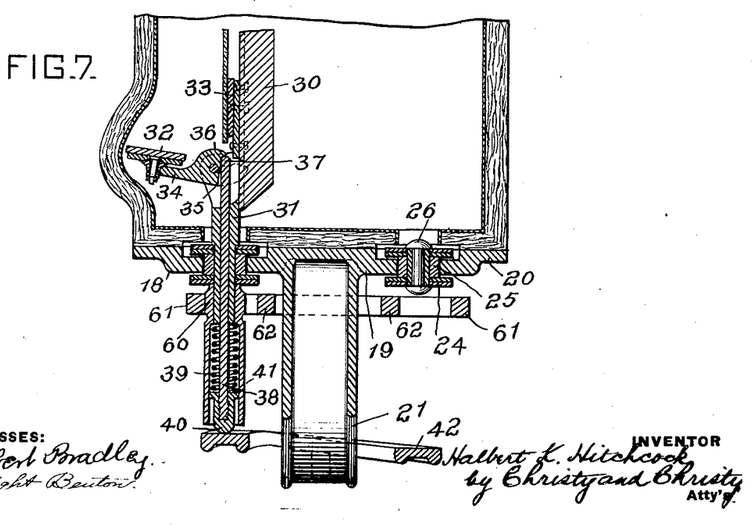
Figure 8:
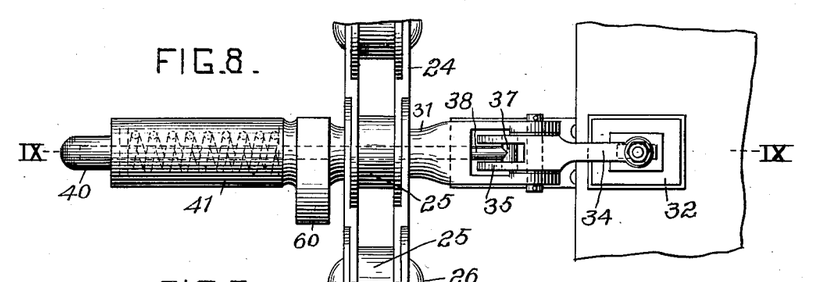
Figs. 8 and 9 are views in elevation and section of portions of the gripping and pulling mechanism.
Figures 9, 10, 14:
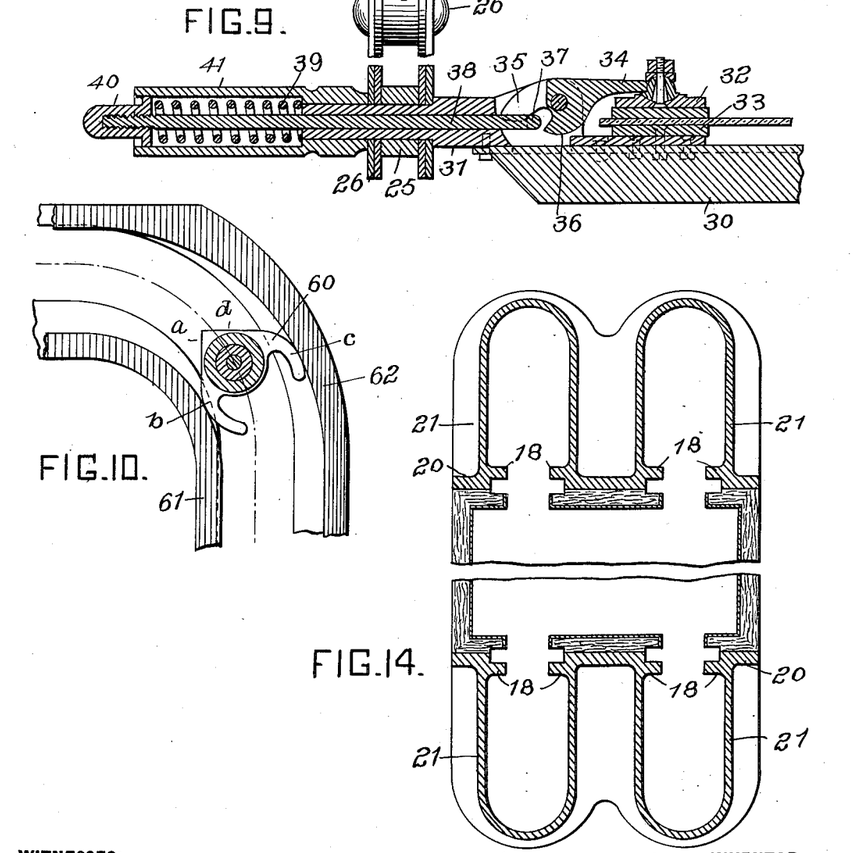
Fig. 10 is a detail view illustrating the means employed for maintaining the gripping mechanism in proper alinement.
Fig. 14 is a sectional plan view of the pulling head the operating parts being omitted.

At the beginning of the operation of forming sheets, the glass forced up through this slot 12 is engaged by a suitable bait whereby it may be drawn up until the glass itself can be caught by the pulling clamps as hereinafter described. After the clamps have thus engaged the sheet the feed and movement of the glass is continuous until the glass contained in the receptacle is exhausted or may be made without intermission if suitable means be provided whereby the glass can be fed into the receptacle without destroying the feeding pressure maintained therein. The glass is pulled up into a head or end chamber at one end of an annealing kiln or chamber. This head or chamber is formed by side castings consisting of three sections 18, 19 and 20 spaced a distance apart as shown in Fig. 7 to permit of the passing of a portion of the pulling chains therethrough. These sections are held together and in proper relation to each other by arched pieces 21 as shown in Figs. 3, 4 and 7. The front part and the portion of the rear wall below the annealing kilns are formed by metal plates and the interior of the head as well as the kiln adjacent to the head is lined with some suitable non-conducting material as asbestos. As shown in Fig. 3 one of the connecting or embracing arches 21 is provided with an extension whereby the head may be connected to and supported by suitable beams 22 extending back and secured to side posts or pillars 23 of the kiln, thereby firmly tying the drawing-head to the kiln. In order to apply a suitable tension to the glass a series of clamps are secured to an endless chain 24 moving vertically and at the upper portion of the head horizontally so as to pull the glass up and after cutting to shift the severed section into suitable conveying means extending from the front to the rear end of the kiln. As shown in Figs. 3, 6, 7, 8 and 9 the chains consist of two series of links arranged respectively on opposite ends of blocks 25 in some instances supported by connecting rivets 26 and in other instances by stems of the clamps as hereinafter described. These blocks 25 fill the slots, or nearly so, between the sections 18, 19 and 20 of the side walls and the links are made sufficiently wide to overlap the edges of these slots and thereby prevent the flow of air through the slots. The chains pass around a sprocket wheel 27 mounted upon a power shaft 28 connected by suitable gearing as shown in Fig. 4 to a motor 29. The clamps consist as shown in Figs. 7, 8 and 9 of a base or body portion 30 of a length somewhat greater than the width of the sheet to be formed and preferably formed of I-beams. These body-portions are provided at their ends with stems 31 passing through the links and blocks 25 of the chains and also with seats or bearings 33 preferably formed of some refractory but yielding material as asbestos, for the glass. The movable member of the clamp is formed by a jaw 32 having a refractory yielding seat and adjustably connected by a ball and socket joint to an arm 34, which is pivotally mounted upon the body of the clamp. This arm 34 is provided with fingers 35 and 36 with which a head 37 on a rod 38 will engage alternately and open and close the movable jaw 32. The stem or the rod 38 passes through the stem 31 of the clamp and is normally pulled outward to close the jaw 32 by a spring 39 bearing at its ends against the stem 31 and a head 40 on the rod 38. It is preferred to surround this spring with a shell or casing 41 as shown in Figs. 8 and 9. When the rod 38 is free to move under the action of the spring, the jaw 32 will be yieldingly held against a plate resting against the bearing or seat on the bodies of the clamps. In order to open the jaws 32, cam plates 42 and 43 are provided at the lower end of the drawhead and at the end adjacent to the kiln, against which the blocks 40 on the rods 38 will bear and be forced inward, so that the head 37 will contact with the fingers 36 on the arm 34 and thereby force the movable jaw to open position as shown in Fig. 7. To permit in one case the jaw passing around the edge of the sheet being drawn and in the other case to permit the escape of the sheet from between the clamps, it will be understood that the opening movement in the latter case need not be as great as in the former. As a clamp which is about to be applied to a sheet has passed around the curve at the lower end of the head the bearing piece 40 will move off of the cam plates 42 and thereby permit the spring 39 to close the clamp against the glass of the side opposite that bearing on the seat on the body of the clamp.

Figure 5:
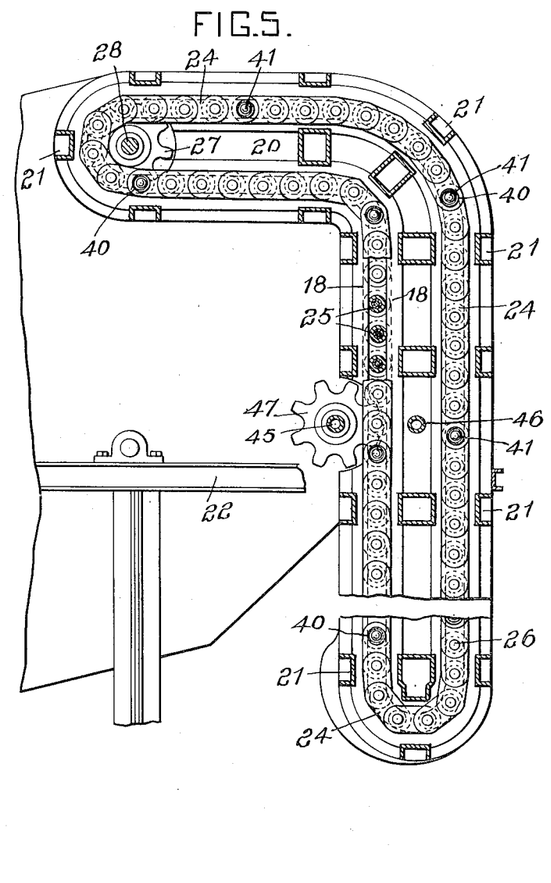
Fig. 5 is a sectional elevation on a plane indicated by the line V—V Fig. 3.

After a clamp has been applied the sheet will be drawn up by the action thereof from the formative point adjacent to the slot 12 and during a portion of this movement two clamps will be operative to effect the pulling. In order to divide the sheet into sections a suitable severing mechanism is employed. A suitable construction for this purpose consists of two wings 44 mounted on shafts 45 and 46, one of the latter being provided with a sprocket wheel 47 intermeshing with one of the chains as shown in Fig. 6, one of the wall sections being cut away for this purpose as shown in Fig. 5. Shafts 45 and 46 have their ends mounted in adjustable bearing blocks 48 and 49 mounted in suitable slides at the sides of the pulling head. These bearing blocks 48 and 49 are provided on their upper and lower sides with lugs through which pass threaded rods 50 and 51 and the blocks are adjusted so as to bring the edges of the wings within the pulling head in proper relation to each other and the sheet of glass being drawn by means of nuts on the rods 50 and 51. In order to prevent injury to the severing wings, the shaft 46 is held in one direction by means of springs 52 so that in case of a too great thickness of glass the wings carried by the shaft and the shaft itself can move outwardly against the tension of the springs. The shafts 45 and 46 and portions of the wings 44 are made hollow for the circulation therethrough of a medium for controlling the temperature of the edges of the wings. Motion is transmitted from the shaft 45 to the shaft 46 by means of gearwheels 53 as shown in Fig. 4 so arranged and mounted as to permit of the adjustment of the shafts toward and from each other without changing and alteration of the relative space. The number of gear wheels employed is such that the blades or wings are rotated in opposite directions and gearwheels are so proportioned and constructed that the edges of the wings will come into the same plane adjacent to the surface of the glass at the same time. The cracking of the glass by these wings can be effected if the glass is quite hot by having the edges of the wings cold, or if the glass is cold at the time of severance by heating the wings. Shields 54 are arranged on opposite sides of the path of upward movement of the clamps, which will direct pieces of broken glass down into a pocket 55 in the pulling head or to the lower floor of the leer which is inclined as shown so that the broken pieces will slide out of the way. It is preferred that these plates should be made yielding or resilient so that their edges may come into close proximity of a sheet being drawn and will yet permit the clamps passing between them.

In order to move the sheets through the kiln, an endless chain is provided carrying a series of posts 56 braced and held in proper position by braces 57. After a section of glass has been severed, it is carried along horizontally by the clamps and placed in position adjacent to one of the supporting posts 56, which are so timed as to be in proper position to receive and support the glass as the clamps carry it along. As the glass sections reach position where they are supported by the posts 56, the clamps are opened by the cam plates 43 and the sheet allowed to move along with the endless chain through the kiln.

In order to insure the holding of the clamps in proper position at all times guide-plates 60 are secured to the stems 31 of the clamps; said guide-plates moving along between guide-ways 61 as shown in Figs. 8 and 10. As the clamps move up with a sheet of glass the edge $a$ of the plates will bear against the vertical wall of the head 61 and thereby prevent a turning of the clamps. As the clamps reach a position where they pass from a vertical to a horizontal movement the edge $a$ of the plate will pass from the guides 61 and a curved portion $b$ of the plate will bear against the curved portion of the rail 61 and thereby prevent a turning of the guide plate to the left in Fig. 10. At the same time a curved portion $c$ of the plate will bear against the rail 62 and prevent an opposite turning of the clamp. As the clamp moves along to a horizontal path or horizontal portion of the rails 61 and 62 the portion $d$ of the plate will bear against the horizontal portion of the rail 62 and thereby prevent any turning of the clamp and their consequent tendency to bend or break the glass plate or sheet. The cutters or wings 44 are so located and operated that they will bear against opposite sides of a sheet just as a clamp begins to move along the curved portion of the head or to move laterally so that in addition to the cracking action produced by the wings there will be a slight lateral movement of the sheet to assist in the severance of the section.

It will be understood that the function of the slot is principally directing the glass to and distributing it at the formative point. The slot also serves as an anchorage or abutment to which the outer portions of the glass passing through the slot will adhere, so that such surface portions will be subjected to a stretching action, as described in Letters Patent Nos. 805,064 and 805,065, dated November 21, 1905. The adherence of the glass will depend upon the temperature of the walls of the slot and the glass passing through the same. Both of these temperatures can be accurately adjusted and maintained by the constructions herein set forth.

The position of the receptacle or basin can be easily adjusted so as to bring the "slot" into alinement with the plane of the upward movement of the clamps of the pulling mechanism. And further by raising and lowering the receptacle or basin, the glass cooling zone between the "slot" and the lower end of the heated chamber or pulling head can be increased or diminished thereby regulating the temperature of the glass between the slot and pulling head. It will be understood that any suitable means can be employed for heating the kiln and pulling head and regulating the temperature in the different portions of the latter.

I claim herein as my invention:

1. An apparatus for the manufacture of glass having in combination a receptacle for molten glass, a drawing orifice, and means for drawing the glass upwardly from said orifice, said orifice having a peripherally continuous wall extending from within the glass to a plane above the glass level, the bottom opening of said orifice being of less area than its area at the glass level, and means for heating the orifice wall.

2. A glass drawing orifice having a peripherally continuous wall extending from within the glass to a plane above the glass level, said orifice being of gradually increasing area in successive planes from its bottom opening upwardly to the level of the glass, and means for heating the orifice wall.

In testimony whereof, I have hereunto set my hand.

HALBERT K. HITCHCOCK.

Witnesses:
ALICE A. TRILL,
BAYARD H. CHRISTY.